United States Patent [19]

Sekiguchi et al.

[11] 4,067,804
[45] Jan. 10, 1978

[54] SOLUTE-SEPARATING MEMBRANE

[75] Inventors: Hideo Sekiguchi, Yokohama; Fumishi Sato, Tokyo; Kazuo Sadamitsu; Kazuaki Yoshida, both of Yokohama, all of Japan

[73] Assignee: The Furukawa Electric Company, Limited, Tokyo, Japan

[21] Appl. No.: 642,593

[22] Filed: Dec. 19, 1975

[30] Foreign Application Priority Data

Dec. 19, 1974  Japan ................... 49-144946

[51] Int. Cl.² .............. B01D 13/00; B01D 39/00; B01D 39/14
[52] U.S. Cl. ................ 210/23 H; 210/23 F; 210/500 M
[58] Field of Search ............ 210/23 H, 500 M, 321 R; 260/32.6 NA, 307 G, 78 TF, 78 R

[56] References Cited

U.S. PATENT DOCUMENTS

| 3,567,632 | 3/1971 | Richter et al. | 210/23 |
|---|---|---|---|
| 3,699,038 | 10/1972 | Boum | 210/23 |
| 3,738,966 | 6/1973 | Studinka et al. | 260/32.6 NA X |
| 3,886,251 | 5/1975 | Sekiguchi et al. | 264/184 |

Primary Examiner—Frank A. Spear, Jr.
Assistant Examiner—David R. Sadowski
Attorney, Agent, or Firm—Stevens, Davis, Miller & Mosher

[57] ABSTRACT

A solute-separating membrane consisting of a polyoxadiazole series resin containing at least one of the structural units of formulae:

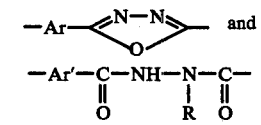

wherein Ar and Ar' are same or different multivalent aromatic residues, and R is an alkyl, cycloalkyl or aralkyl group having from 1 to 7 carbon atoms, and swollen to a swelling degree of 1.7–15 with a swelling agent of water, a solvent miscible with water, or a mixture of water and the solvent has a high separating ability and further has high mechanical strength and chemical and thermal stabilities.

15 Claims, No Drawings

SOLUTE-SEPARATING MEMBRANE

The present invention relates to a solute-separating membrane for separating a substance contained in a solution or a suspension.

Recently, reserve osmosis membrane, ultra-filtration membrane, microporous membrane and the like have been developed and utilized in order to produce pure water from sea water and to separate a solute contained in a solution.

However, the production process of these membranes is complicated and has problems in the reproducibility of membrane, and further these membranes are insufficient in the thermal stubility, chemical stability, mechanical strength and the like, and moreover are expensive.

The object of the present invention is to provide an inexpensive solute-separating membrane having a high solute-separating ability and further having excellent thermal stability, chemical stability and mechanical strength.

The inventors have recently developed polyoxadiazole series resin as a heat-resistant resin and already produced films and fibers of the polyoxadiazole series resin by means of a wet forming method and supplied them to the market as a useful industrial material. The inventors have newly found out that a swollen membrane, which is obtained as an intermediate article in the course of the wet forming of the polyoxadiazole series resin and is swollen with a large amount of water, has a high solute-separating ability, and such swollen membrane can be used as a separating membrane of a solute from an aqueous or non-aqueous solution containing the solute, and further continued earnestly the investigation and accomplished the present invention.

That is, the solute-separating membrane of the present invention consists of a polyoxadiazole series resin containing at least one of the structural units of formulae:

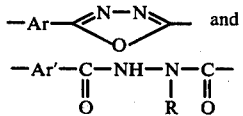 and $$-Ar'-\underset{O}{\overset{\|}{C}}-NH-\underset{R}{\overset{\|}{N}}-\underset{O}{\overset{\|}{C}}-$$

wherein Ar and Ar' are same or different multivalent aromatic residues, and R is an alkyl, cycloalkyl or aralkyl group having from 1 to 7 carbon atoms, and swollen to a swelling degree of 1.7–15 with a swelling agent selected from the group consisting of water, a solvent miscible with water, and a mixture of water and the solvent.

The term "swelling degree" herein used means the weight ratio of swollen membrane to dry resin.

In the present invention, the swelling degree of the polyoxadiazole series resin membrane swollen with a swelling agent of water, a solvent miscible with water or a mixture of water and the solvent is limited within the range of from 1.7 to 15, preferably from 2 to 12. The reason is that, when the swelling degree is less than 1.7, solvent to be treated, which contains a solute, does not at all permeate through the membrane or the permeation velocity of the solvent is very slow, and the membrane can not be practically used as a separating membrane. On the other hand, when the swelling degree is more than 15, the permeation velocity of the solvent becomes high, but the separating ability and mechanical strength of the membrane are decreased, and the membrane is not effective as a separating membrane.

The reason why the polyoxadiazole series resin membrane to be used in the present invention is limited to a membrane swollen with a swelling agent of water, a solvent miscible with water or a mixture thereof and obtained by a wet forming process, is that the swollen membrane has such a irreversible property that, if the amount of a swelling agent contained in a membrane obtained by a wet forming process is once decreased to less than a specified amount, the membrane can not be restored to the originally swollen state even when the membrane is immersed in the swelling agent.

As the swelling agents which swells the resin constituting the solute-separating membrane of the present invention, water may be generally used. However, there is a fear in the use of water that the resin swollen with water is easily dried with the lapse of time in the drying condition and the function of the resin as a separating membrane is deteriorated.

Accordingly, it is preferable to maintain stable function as a separating membrane by immersing a resin membrane swollen with water in a solvent, which is miscible with water and has a boiling point higher than that of water, to replace the water with the solvent.

As the solvent miscible with water, mention may be made of acetone, methyl alcohol, ethyl alcohol, dioxane, tetrahydrofuran, ethylene glycol, glycerine, polyethylene glycol and the like. Among them, ethylene glycol, glycerine, polyethylene glycol are preferable.

When water is used as a swelling agent, separating membranes can be produced inexpensively due to the easiness in the handling of water, but there is a problem in the storage stability of the resulting separating membranes as described above. While, the use of ethylene glycol, glycerine and polyethylene glycol as a swelling agent is preferable, because these solvents have a high chemical resistance and a high boiling point, and the resulting separating membranes have a high storage stability. Similarly, the use of mixtures of water and ethylene glycol, glycerine or polyethylene glycol is also preferable, because the mixture has a high chemical resistance and a high boiling point, and the resulting separating membranes have a high storage stability.

In the separating membrane of the present invention, the separating ability can be occasionally regulated by replacing water contained in a membrane with a solvent miscible with water.

The separating membrane of the present invention is a symmetric membrane or an asymmetric membrane, such as Loeb type membrane, and can be used in the form of a plain membrane, a spirally coiled tube, a tube, a hollow fiber and other optional shapes depending upon the use purpose.

The separating membrane consisting of polyoxadiazole series resin according to present invention can be directly produced from a starting resin solution, i.e., a solution of a polyoxadiazole series resin in an organic solvent, concentrated sulfuric acid or concentrated phosphoric acid, by the wet forming method. Alternatively, the membrane can be produced from the starting resin solution by dry forming firstly an ultra-thin dry film on its surface and then wet forming the resin solution having the dry skin similarly to the case of the production of Loeb type membrane.

Among the above described methods, the method, wherein a membrane is formed from a solution of polyoxadiazole series resin in concentrated surfuric acid by the wet forming method, can be easily carried out under variously controlled membrane-forming conditions, and separating membranes having different asymmetries and densities can be produced. Accordingly, this method has such a merit that the method can produce easily separating membranes for various uses. That is, a separating membrane, which can be permeated with water or a low molecular weight solute at a very high velocity, or reversely a separating membrane having a high rejection against permeation of salts, such as sodium chloride and the like, present as a solute in a solution, can be obtained.

Furthermore, when the swollen membrane obtained by the above-described methods is subjected to a uniaxial or biaxial drawing or to a hot-water treatment at a temperature of higher than 70° C, the texture of the membrane becomes dense, and membranes having improved separating ability and mechanical strength can be obtained.

The polyoxadiazole series resins to be used in the present invention are the following (A) polyoxadiazole resin, (B) polyhydrazide resin and (C) oxadiazole-hydrazide copolymeric resin, and (D) blends of at least two of the above described resins (A), (B) and (C).

A. Polyoxadiazole resin: a linear or non-linear polyoxadiazole having a repeating structural unit of general formula:

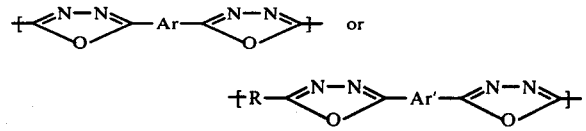

wherein Ar and Ar' are the same or different multivalent aromatic residues, and may contain in part aromatic residues having not less than tri-valency, the molecular weight of said resin corresponding to an inherent viscosity of more than 1.5 in a 0.5 g/dl resin solution in 98% by weight sulphuric acid at 30° C.

B. Polyhydrazide resin: a linear or non-linear poly(N-substituted hydrazide) having a repeating structural unit of general formula:

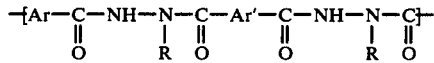

wherein Ar and Ar' are the same or different multivalent aromatic residues, and may contain in part aromatic residues having not less than tri-valency, and R is an alkyl, cycloalkyl or aralkyl group having from 1 to 7 carbon atoms, the molecular weight of said resin corresponding to an inherent viscosity of more than 0.4 in a 0.5 g/dl resin solution in 98% by weight sulphuric acid at 30° C.

C. Oxadiazole-hydrazide copolymeric resin: a linear or non-linear oxadiazole-N-substituted hydrazide copolymeric resin having repeating structural units of general formulae:

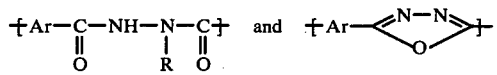

wherein Ar is multivalent aromatic residue, and may contain in part aromatic residues having not less than tri-valency, and R is an alkyl, cycloalkyl or aralkyl group having from 1 to 7 carbon atoms, the molecular weight of said resin corresponding to an inherent viscosity of more than 0.4 in a 0.5 g/dl resin solution in 98% by weight sulphuric acid at 30° C.

In preferred embodiments, the polyoxadiazole resin of group (A) is a poly(phenylene-1,3,4-oxadiazole) having a repeating structural unit of general formula:

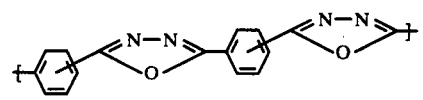

wherein

is a p- or m-phenylene residue; the poly-N-substituted hydrazide of group (B) has a repeating structural unit of the formula:

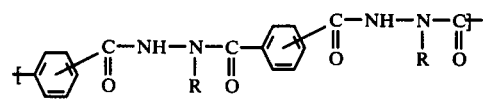

wherein

in a p- or m-phenylene residue, and R is a methyl, ethyl, n-propyl, isopropyl or tertiary butyl group; or the oxadiazole N-substituted hydrazide copolymeric resin of group (C) consists of structural units having the following formulae:

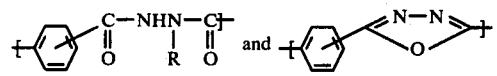

(1)                        (2)

wherein

in a p- or m-phenylene residue and R is a methyl, ethyl, n-propyl, isopropyl or tertiary butyl group.

In an alternative embodiment of the invention, the multivalent aromatic residues in said resins may contain a heterocycle other than oxadiazole for improving mechanical properties.

In order to produce a non-linear polyoxadiazole and/or poly N-substituted hydrazide resin it is possible to include aromatic residues having not less than tri-valency in any of the above resins, and the resin membrane containing not more than 30 mol % of these residues is improved in mechanical strength. Among these aromatic residues, trimesic acid residue is more preferable.

Polyoxadiazole resins for use in the present invention can be produced by the following processes:

1. J. Polymer Sci., A3 45 (1965). A polyoxadiazole is produced by reacting an aromatic dibasic acid or a derivative thereof with hydrazine or a salt thereof in fuming sulphuric acid or polyphosphoric acid.

2. A copolymeric oxadiazole series resin consisting of oxadiazole and another heterocycle is obtained by reacting a dicarboxylic acid containing the heterocycle or a derivative thereof with hydrazine or a salt thereof in fuming sulphuric acid or polyphosphoric acid.

3. U.S. Pat. No. 3,238,183 and J. Polymer Sci., A2 1157 (1964). An aromatic dibasic acid halide is reacted with hydrazine or an aromatic dibasic acid hydrazide in the presence of an acid acceptor to produce a polyhydrazide, which is converted into an oxadiazole by heating.

4. Makromol. Chem. 44-6 388 (1961). Bistetrazole derived from an aromatic dibasic acid is reacted with an aromatic dibasic acid halide in the presence of an acid accepter to produce a polyoxadiazole.

5. J. Polymer Sci., A5 242 (1967). A tetramine containing an oxadiazole unit in the main chain is reacted with a diphenylester of an aromatic dibasic acid to produce an ordered copolymer containing alternating oxadiazole and benzimidazole units.

It is preferred that the polyoxadiazole to be used in the present invention be produced by process (1) or (2).

The aromatic dibasic acid used in process (1) includes, for example, terephthalic acid, isophthalic acid, 4,4'-dicarboxydiphenyl, 4,4'-dicarboxydiphenyl ether, 3,4'-dicarboxyldiphenyl ether, 4,4'-dicarboxydiphenyl sulphide, 4,4'-dicarboxydiphenylsulphone, 2,5-dichloroterephthalic acid, 2,6-dihydroxyterephthalic acid, and the aromatic dicarboxylic acids which contain a heterocycle other than oxadiazole, e.g. a benzimidazole, benzoxazole, benzthiazole, thiadiazole, imidazopyrrolone or isoindroquinazolinedione. The latter compounds include 2,2'-bis(p-carboxyphenyl)-5,5'-bisbenzimidazole, 2,2'-bis(m-carboxyphenyl)-5,5'-bisbenzimidazole, 2,2'-bis(m-carboxyphenyl-5,5'-bisbenzoxazole, 2,5-bis(p-carboxyphenyl)-1,3,4-thiadiazole, 6,6'-bis(m-carboxyl)isoindole[1,2-a]quinazolinedione and 2-(p-carboxyphenyl)5(6)-carboxybenzimidazole. The aromatic polybasic acid having not less than tri-valency which may replace part of these acids includes for example trimesic acid, pyromellitic acid and hemimellitic acid. Derivatives of these organic acids include the alkyl ester, in which the alkyl radical has from 2 to 4 carbon atoms, for example, diethyl terephthalate, diisopropyl terephthalate, dibutyl terephthalate, diethyl isophthalate; the amide, such as terephthalamide or isophthalamide; the dihydrazide, such as terephthaldihydrazide or isophthaldihydrazide; and the nitrile, such as terephthalonitrile, or isophthalonitrile. Among the polyoxadiazole and/or poly N-substituted hydrazide resins, the preferred resin having a high mechanical strength and chemical resistance is one containing p-phenylene or m-phenylene residues.

The resin containing N-substituted hydrazide structural units can be easily obtained by reacting a polyoxadiazole produced in the above described processes with an alkyl, cycloalkyl or aralkyl sulphate, preferably methyl, ethyl, isopropyl, n-propyl or tertiary butyl sulphate in its chemical stability, and in this case, the amount of N-substituted hydrazide structural units introduced can be varied by varying the ratio of said sulphates to oxadiazole structural units, so that a homopolymer containing only N-substituted hydrazide structural units or a copolymer having N-substituted hydrazide structural units and oxadiazole structural units can be easily produced.

The inherent viscosity of the resin is shown by the following formula:

$$\eta \text{ inh.} = \text{rel.}/c.$$

$\eta$ inh. = inherent viscosity
$\eta$ rel. = relative viscosity
$c$ = concentration of resin ($\approx 0.5$ g/dl) 30° C, in 98% by weight sulphuric acid.

The inherent viscosity, corresponding to the molecular weight, of the resin to be used in the invention is limited because, even though shaped articles can be obtained when the inherent viscosity is less than the lower limit, when the molecular weight of said resin is too low, the mechanical strength and thermal and chemical stabilities are poor and the resulting shaped articles cannot be used commercially.

The solute-separating membrane of the present invention can be used as a separating membrane in dialysis of a solute having a low molecular weight or a medium molecular weight from a solution containing the solute dissolved therein, in filtration of a substance from a colloidal solution or an emulsion, in which the substance is dispersed in a hard-to-separate form, or in the separation of a solute from a solution by passing the solvent alone through the membrane and by rejecting the solute. The separating membrane of the present invention is superior to conventional reverse osmosis membrane and ultra-filtration membrane in the mechanical strength, and can be used even at a temperature higher than 100° C, at which conventional separating membranes can not be used, without causing deformation of membrane or without deforming into a more dense membrane due to pressure. The separating membrane of the present invention is preferable to be used in ultra-filtration membrane because of its characteristic property that water or a low molecular weight substance at the ultrafiltration can permeate through the membrane at a high velocity. Further, the membrane of the present invention is excellent in the chemical stability. For example, the membrane is stable in solutions having a very wide PH range of 3.0-11.0. Of course, the membrane may be used even outside the range under some conditions. Therefore, the membrane of the present invention can be used, owing to both of its high chemical and temperature stabilities, even under a severe condition, under which conventional separating membranes can not be used.

As described above, the solute-separating membrane of the present invention can be widely used in the treatment and recovery of waste water, purification of water, recovery of useful component from solution, removal of unnecessary component from solution, dialysis of blood and other treatments. Therefore, The present invention provides a new material very valuable in industry.

The following example are given for the purpose of illustration of this invention and are not intended as limitations thereof.

EXAMPLE 1

Starch was separated from a 1% starch aqueous solution by the use of a plain membrane, which consisted of poly(p-phenylene-1,3,4-oxadiazole) having an inherent viscosity of 4.8, contained water and had a swelling degree of 6.2 and a thickness of 150μ (thickness in dry state: 20μ). For comparison, the same separation was carried out by the use of plain membrane containing water and having a swelling degree of 1.23 and a thickness of 20μ, which was prepared by drying the above described water-containing membrane. For further comparison, the same separation was carried out by the use of a cellulose membrane used for ultra-filtration having a thickness of 150μ. The results obtained are shown in the following Table 1 together with the mechanical properties of the membranes.

Table 1

|  | Membrane of Example 1 | Comparative air-dried membrane | Comparative cellulose membrane |
|---|---|---|---|
| Permeation velocity of water (t/m² · day) | 6.5 | 0 | 4.0 |
| Concentration of starch in permeated liquid (%) | 0.0 | 0.0 | 0.0 |
| Applied pressure (kg/cm²) | 3.5 | 3.5 | 3.5 |
| Tensile strength of membrane (kg/cm²) | 66 | 850 | 37 |
| Elongation of membrane at break (%) | 140 | 120 | — |

Further, in order to examine the chemical resistance of the membrane of Example 1, the membrane was immersed at 30° C in an aqueous sodium hydroxide solution having a PH of 11 or in an aqueous sulfuric acid solution having a PH of 3 for 1 month, and the variation of its tensile strength was measured, and no change was observed in the strength.

EXAMPLE 2

A plain membrane, which consisted of the same resin as used in Example 1, contained a mixture of water and polyethylene glycol (molecular weight: 200) in a mixing ratio of 1:3 and had a swelling degree of 5.3, a thickness of 80μ (thickness in dry state: 11μ), a tensile strength of 82 kg/cm² and an elongation at break of 85%, was immersed in water for 1 hour. By the use of the above treated membrane, oils in an emulsified state was separated from a waste water. The results obtained are shown in the following Table 2.

Table 2

|  | Membrane of Example 2 | conventional cellulose acetate membrane (thickness 80μ) |
|---|---|---|
| Amount of oils extracted from waste water by n-hexane (mg/l) | 12 | 12 |
| Amount of oils extracted from permeated water by n-hexane (mg/l) | less than 1 | less than 1 |
| Permeation velocity of water (t/m² · day) | 4.0 | 1.3 |
| Applied pressure (kg/cm²) | 2.0 | 2.0 |

EXAMPLES 3–6

A plain membrane having a thickness of 60μ (thickness in dry state: 8μ), which consisted of a copolymer consisting of 85 mol% of p-phenylene-1,3,4-oxadiazole unit and 15 mol% of p-phenylene-N-methylhydrazide unit and having an inherent viscosity of 3.2, was heat treated in a pressurized hot water kept at 120° C for 10 minutes to prepare a membrane containing water and having a swelling degree of 4.9. A waste water in the food industry was treated with the above swollen membrane. The results obtained are shown in the following Table 3.

Table 3

| Example | BOD in waste water (ppm) | COD in waste water (ppm) | treating pressure (kg/cm²) | treating temperature (° C) | Permeation velocity of water (t/m² · day) | BOD in teated water (ppm) | COD in treated water (ppm) |
|---|---|---|---|---|---|---|---|
| 3 | 15,300 | 2,800 | 50 | 26 | 1.0 | 20 | 2 |
| 4 | 34,000 | 8,500 | 50 | 20 | 1.1 | 38 | 13 |
| 5 | 60,000 | 16,000 | 50 | 15 | 0.8 | 80 | 50 |
| 6 | 34,000 | 8,500 | 50 | 73 | 1.1 | 40 | 12 |

EXAMPLE 7

A membrane, which consisted of an alternate copolymer consisting of 2,5-bis(p-phenylene)-1,3,4-oxadiazole component and 2,2'-5,5'-bibenzimidazole component and having an inherent viscosity of 2.8, contained water and had a swelling degree of 3.5 and a thickness of 75μ (thickness in dry state: 10μ), was immersed in acetone for 2 hours and then dried in air for 30 minutes to prepare a membrane containing a mixture of acetone and water in a mixing ratio of 4:1 (weight ratio) and having a swelling degree of 2.0. A 0.5% aqueous sodium chloride solution was passed through the resulting membrane at a temperature of 27° C under a pressure of 80 kg/cm² to separate the sodium chloride. As the result, the sodium chloride was able to be separated at a rejection of 89% and a permeation velocity of 0.4 t/m²·day.

For comparison, a membrane consisting of the same copolymer as described above, containing a mixture of acetone and water in a mixing ratio of 3:2 (weight ratio) and having a swelling degree of 1.25 was used, and the same experiment as described above was effected. However, water did not permeate through the membrane.

EXAMPLE 8

A membrane, which was obtained from a blend of poly(phenylene-1,3,4-oxadiazole) having 80 mol% of p-phenylene bond and 20 mol% of m-phenylene bond and having an inherent viscosity of 3.7 and polyethylene terephthalamide having an inherent viscosity of 1.2 in a mixing ratio of 3:1 (weight ratio), contained water and had a swelling degree of 5.5 and a thickness of 160μ (thickness in dry state: 24μ), was heated in a hot water at 100° C for 30 minutes to prepare a membrane having a swelling degree of 3.4. An electro paint for electrolytic deposition coating was treated with the above obtained membrane.

That is, in order to remove unnecessary water, low molecular weight substances and inorganic ions from an electro paint, the paint was passed through the above membrane under a pressure of 3 kg/cm². The results obtained are shown in the following Table 4.

Table 4

|  | Coating solution before treatment | Coating solution after treatment |
|---|---|---|
| PH | 8.3 | 8.5 |
| Solid content (wt · %) | 10.0 | 10.0 |
| Electric conductivity ($\mu\Omega^{30}$/cm) | 1,900 | 1,400 |
| MEQ | 69 | 53 |

EXAMPLE 9

The same poly(p-phenylene-1,3,4-oxadiazole) plain membrane as used in Example 1 was drawn to 1.8 times its original length in only uniaxial direction to prepare a membrane containing water and having a swelling degree of 5.2 and a thickness of 60μ. The resulting membrane had a tensile strength of 125 kg/cm$^3$ and an elongation of at break of 48%.

The dialysis velocity of waste materials in blood through the above membrane was measured. For comparison, the dialysis velocity of the same waste materials through a cellulose type dialysis membrane, Cuprophane, was measured.

The following Table 5 shows the ratio of the dialysis velocity by the membrane of Example 9 to that by Cuprophane.

Table 5

| | Dialysis velocity ratio (Membrane of Example 9/Cuprophane) |
|---|---|
| Urea | 1.39 |
| Creatinine | 1.48 |
| Vitamin B$_{12}$ | is not permeated, i.e., is rejected by either membrane |
| Water | 8.5 |

EXAMPLE 10

A hollow fiber, which was obtained from a blend of copoly(phenylene-1,3,4-oxadiazole) having 95 mol% of p-phenylene linkage and 5 mol% of 2,5-dichloro-p-phenylene linkage and having an inherent viscosity of 3.5 and poly(p-phenylene N-isopropyl hydrazide) having an inherent viscosity of 0.8 in a mixing ratio of 85:15 (weight ratio) and swollen with glycerine, had a swelling degree of 2.3, a thickness of 130μ (thickness in dry state: 52μ) and an outer diameter of 420μ. A module consisted of 25 of the hollow fibers bonded together in both ends with epoxide resin. A 0.5% aqueous sodium chloride solution was passed through the module at a temperature of 32° C under a pressure of 45 kg/cm$^2$ to separate the sodium chloride. As the result, the sodium chloride was able to be separated at a rejection of 92% and a permeation velocity of 3.4 l/module-day (0.15 g/m$^2$·day).

EXAMPLES 11-16

A plan membrane having a thickness of 100μ and swollen with water was obtained from a copolymer consisting of 36 mol% of 1,3,4-oxadiazole unit and 64 mol% of N-ethyl hydrazide unit, and the aromatic residue in the copolymer cnsisting of 85 mol% of p-phenylene and 15 mol% of an aromatic residue containing a heterocycle mentioned in the following Table 6.

Bovine albumin was separated from an aqueous solution containing 2,000 ppm of the albumin by the use of each membrane under a pressure of 5 kg/cm$^2$. The results obtained are shown in Table 6 together with the properties of the membranes.

| | Polymer | | Properties of membrane | | | | |
|---|---|---|---|---|---|---|---|
| Ex. | Aromatic residue | Inherent viscosity | Swelling degree | Tensile strength (Kg/cm$^2$) | Elongation at break (%) | Rejection (%) | Permeation velocity (t/m$^2$·day) |
| 11 | [structure: bis-oxazole] | 2.8 | 4.6 | 72 | 89 | 98 | 4.5 |
| 12 | [structure: bis-imidazole NH] | 3.2 | 4.5 | 80 | 92 | 95 | 4.0 |
| 13 | [structure: benzimidazole NH] | 3.5 | 4.8 | 74 | 81 | 98 | 4.8 |
| 14 | [structure: N=N-S thiadiazole] | 2.0 | 4.3 | 61 | 105 | 90 | 4.0 |
| 15 | [structure: bis-isoindolinone C=O] | 2.8 | 4.6 | 63 | 48 | 92 | 4.2 |
| 16 | [structure: bis-benzothiazole S,N] | 3.0 | 5.0 | 75 | 100 | 96 | 4.5 |

EXAMPLE 17

A plain membrane, which consisted of a copolymer consisting of 70 mol% of p-phenylene-1,3,4-oxadiazole, 24 mol% of m-phenylene-1,3,4-oxadiazole and 6 mol% of trimesic-1,3,4-oxadiazole components and having an inherent viscosity of 2.8, contained polyethylene glycol (molecular weight: 1,200) and had a swelling degree of 4.2, a thickness of 140μ (thickness in dry state: 19μ), a tensile strength of 88 kg/cm$^2$, and elongation at break of 37%, was immersed in water for 30 minutes. By the use of the above treated membrane, two kinds of Dextran were separated from their aqueous solution. The results obtained are shown in the following Table 7.

Table 7

| Solute | Dextran 3 (average MW: 3,000) | Dextran 4 (average MW: 20,000) |
|---|---|---|
| Concentration of aqueous | | |

Table 7-continued

| Solute | Dextran 3 (average MW: 3,000) | Dextran 4 (average MW: 20,000) |
|---|---|---|
| solution before treatment (ppm) | 200 | 200 |
| Rejection (%) | 85 | 99 |
| Permeation velocity of water (t/m$^2$ · day) | 2.0 | 2.0 |
| Applied pressure (kg/cm$^2$) | 5.0 | 5.0 |

EXAMPLE 18

A Loeb type asymmetric plain membrane, which consisted of poly(p-phenylene N-methylhydrazide) having an inherent viscosity of 0.6, contained glycerine and had a swelling degree of 2.4 and a thickness of 150μ (thickness in dry state: 28μ), was immersed in water for 2 hours. A 5% aqueous saccharose solution was passed through the resulting membrane under a pressure of 30 kg/cm$^2$ to separate the succharose. As the result, the succharose was able to be separated at a rejection of 95% and a permeation velocity of 1.2 t/m$^2$·day.

EXAMPLE 19

A tubular type membrane obtained by forming on a porous ceramic pipe (inner diameter: 19 mm, outer diameter: 25 mm, length: 120 mm), which consisted of poly(p-phenylene-1,3,5-oxadiazole) having an inherent viscosity of 3.7, contained ethylene glycol and had a swelling degree of 11 and a thickness of 80μ, was immersed in water for 1 hour. A 0.5% aqueous solution of Dextran 150 (average molecular weight: 150,000) was passed through the tubular membrane from the outside under a pressure of 5 kg/cm$^2$ to separate the Dextran 150. As the result, the Dextran 150 was able to be separated at a rejection of 99% and a permeation velocity of 8.0 t/m$^2$·day.

What is claimed is:

1. In the process of separating a solute from an aqueous or non-aqueous solution containing the solute using a separation membrane, the improvement comprising using as the separation membrane a solute-separating membrane consisting of at least one polyoxadiazole series resin selected from the group consisting of A. polyoxadiazole resin having a repeating structural unit of the general formula:

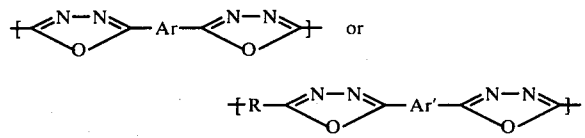

wherein Ar and Ar' are the same or different multivalent aromatic residues, and

B. oxadiazole-N-substituted hydrazide copolymeric resin insoluble in organic solvent having separating structural units of general formulae:

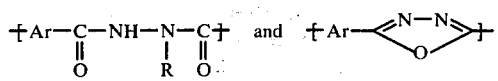

wherein Ar is a multivalent aromatic residue and R is an alkyl, cycloalkyl or aralkyl group having from 1 to 7 carbon atoms, and swollen to a swelling degree of 1.7–15 with a swelling agent selected from the group consisting of water, a solvent miscible with water, and a mixture of water and said solvent.

2. A process according to claim 1, wherein said swelling degree is from 2 to 12.

3. A process according to claim 1, wherein said solvent miscible with water is at least one solvent selected from the group consisting of acetone, methyl alcohol, ethyl alcohol, dioxane, tetrahydrofuran, ethylene glycol, glycerine and polyethylene glycol.

4. A process according to claim 1, wherein said swelling agent is a member selected from the group consisting of water, ethylene glycol, glycerine and polyethylene glycol.

5. A process according to claim 1, wherein said swelling agent is a mixture of water and one of ethylene glycol, glycerine and polyethylene glycol.

6. A process according to claim 1, wherein at least a part of the multivalent aromatic residue of the polyoxadiazole series resin is an aromatic residue containing a heterocycle selected from the group consisting of benzimidazole, benzoxazole, benzthiazole, thiadiazole, imidazopyrrolone and isoindroquinazolinedione.

7. A process according to claim 1, wherein not more than 30 mol% of the multivalent aromatic residue in the polyoxadiazole series resin is aromatic residues having not less than tri-valency.

8. A process according to claim 1, wherein not more than 30 mol% of the multivalent aromatic residue in the polyoxadiazole series resin is trimesic acid residue.

9. A process according to claim 1, wherein said membrane is a drawn membrane.

10. A process according to claim 1, wherein said membrane is an ultra-filtration membrane.

11. A process according to claim 1, wherein said membrane is a reverse osmosis membrane.

12. A process according to claim 1, wherein said polyoxadiazole series resin is polyoxadiazole resin (A) having a repeating structural unit of general formula:

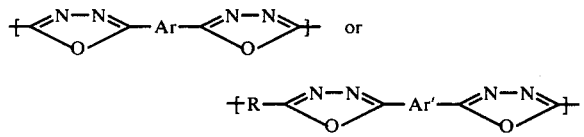

wherein Ar and Ar' are the same or different bivalent aromatic residues, the molecular weight of said resin corresponding to an inherent viscosity of more than 1.5 in a 0.5g/dl solution in 98% by weight sulphuric acid at 30° C.

13. A process according to claim 1, wherein said polyoxadiazole series resin is oxadiazole-N-substituted hydrazine copolymeric resin (B) insoluble in organic solvent having separating structural units of general formulae:

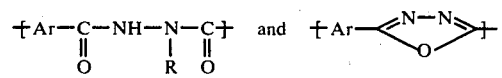

wherein Ar is a bivalent aromatic residue and R is an alkyl, cycloalkyl or aralkyl group having from 1 to 7 carbon atoms, the molecular weight of said resin corresponding to an inherent viscosity of more than 0.4 in a 0.5g/dl resin solution in 98% by weight sulphuric acid at 30° C.

14. A process according to claim 1, wherein said polyoxadiazole series resin is a blend (C) of said resins (A) and (B).

15. A process according to claim 1, wherein said polyoxadiazole series resin is a resin selected from the group consisting of (A) poly(phenylene-1,3,3-oxadiazole), (B) phenylene-1,3,4-oxadiazole/phenylene N-R substituted hydrazide copolymer, wherein R is an alkyl group selected from the group consisting of methyl, ethyl, n-propyl, isopropyl and tertiary butyl groups and (C) blends of the resins (A) and (B).

* * * * *